US005143572A

United States Patent [19]

Hatch

[11] Patent Number: 5,143,572

[45] Date of Patent: Sep. 1, 1992

[54] DOWEL SHOOTING APPARATUS

[76] Inventor: J. Mel Hatch, 4850 S. Hidden Cove Cir., Murray, Utah 84123

[21] Appl. No.: 483,673

[22] Filed: Feb. 23, 1990

[51] Int. Cl.[5] .......................... B25C 1/00; B29C 65/48

[52] U.S. Cl. .................................... 156/293; 156/423; 156/575; 156/579; 227/14; 227/139

[58] Field of Search ............... 227/114, 115, 116, 117, 227/118, 120, 123, 139, 130, 107, 110, 14, 26; 29/464, 468; 221/233, 234, 235; 156/575, 578, 579, 293, 92, 298, 362, 423, 72

[56] References Cited

U.S. PATENT DOCUMENTS

| | | | |
|---|---|---|---|
| 2,953,787 | 9/1960 | Ollig et al. | 227/139 |
| 3,339,799 | 9/1967 | Spisak | 221/233 |
| 3,386,639 | 6/1968 | Unger | 227/14 |
| 3,670,942 | 6/1972 | Pomeroy | 227/118 |
| 4,220,114 | 9/1980 | Radowicz | 156/578 |

FOREIGN PATENT DOCUMENTS

| | | | |
|---|---|---|---|
| 2806968 | 8/1979 | Fed. Rep. of Germany | 227/26 |
| 3121111 | 9/1982 | Fed. Rep. of Germany | 227/139 |
| 3602542 | 7/1987 | Fed. Rep. of Germany | 227/26 |
| 0854710 | 8/1981 | U.S.S.R. | 227/14 |
| 1238527 | 7/1971 | United Kingdom | 227/14 |

*Primary Examiner*—Michael W. Ball
*Assistant Examiner*—Steven D. Maki
*Attorney, Agent, or Firm*—Terry M. Crellin

[57] ABSTRACT

Dowel shooting apparatus comprising a dowel feed component for feeding dowels one at a time from a bulk supply of dowels to a flexible tube that is connected to a dowel shooting gun. The dowel feed component advances dowels in the flexible tube and a receiving unit is provided in the shooting gun for accepting dowels one at a time and positioning the dowels in an ejection chamber in the shooting gun. A striker is provided for ejecting the dowel from the chamber upon activation of the trigger of the shooting gun. A glue system is also provided for injecting or spraying a proper amount of liquid glue into the cavity in which the dowel is to be driven just prior to the ejection of the dowel from the chamber of the dowel gun. The dowel gun further has a nose cone having a positioning lug extending therefrom with the positioning lug being used to align the nose cone with the cavity.

9 Claims, 2 Drawing Sheets

DOWEL SHOOTING APPARATUS

BACKGROUND OF THE INVENTION

1. Field of the Invention

The present invention relates to improved apparatus and method for feeding and driving dowels into preformed cavities in a workpiece. In particular, the invention relates to a novel power operated dowel gun and system for rapidly feeding dowels to the gun, wherein the gun and system have a relatively simple and inexpensive design which results in exceptional reliability and durability.

2. State of the Art

In mass production of cabinets and other similar items, expedited methods of inserting dowels in respective cavities in the workpieces have been used. Power operated, dowel shooting guns have been proposed. These guns have been generally unreliable, with high incidence of jamming and misfiring. The problems result in excessively high maintenance costs.

A major problem is feeding dowels from a bulk source to the dowel shooting gun. Some of the systems of the prior art utilize a pneumatic feed tube such as disclosed in U.S. Pat. No. 3,906,615 for feeding one dowel at a time to the dowel shooting gun. Such a system requires complex apparatus for introducing the dowels one at a time into the pneumatic feed tube, as well as for receiving the dowels at the gun. Other systems attempt to push dowels through a flexible tube, but such systems also require complex means for feeding dowels to the feed end of the tube and for accepting dowels at the dowel gun from the tube. Jamming of dowels is a constant problem which results in numerous misfiring of the gun. The constant jamming problems and the complex apparatus results in excessive, costly maintenance on the system.

In addition, the guns of the prior art have been aligned with the cavities by the operator positioning the gun using his eyesight as his only guide. As a result, the gun is often misaligned with the cavities which results in poor, incomplete entry of the dowels into their respective cavities. As a result, the workman has to go back and hammer in all dowels to be sure that they are fully inserted into their respective cavities.

3. Objectives

A principal objective of the invention is to provide a novel dowel gun and feed apparatus that incorporates a flexible tube between a bulk supply of the dowels and the dowel gun, with relatively simple, reliable means for feeding dowels to the flexible tube to maintain the tube filled with dowels in end-to-end relationship, and simple, reliable means at the gun for accepting dowels one at a time as the dowels are pushed through the flexible tube.

Another objective of the present invention is to provide a dowel gun having an improved nose cone which has novel means for alignment of the nose cone with the cavity in the workpiece such that the dowel will be driven accurately and thoroughly into the cavity.

A further objective of the present invention is to provide a glue system incorporated with the dowel gun, wherein the glue system injects a proper amount of liquid glue into the cavity in the workpiece momentarily before the dowel is driven into the cavity.

A still further objective of the present invention is to provide a novel dowel gun and feed apparatus incorporating a flexible tube between a bulk supply of the dowels and the dowel gun, a glue system for injecting liquid glue into the cavity in the workpiece and a synchronizing timer and actuator that controls the operation of all components upon pressing of the trigger on the dowel gun to (a) inject a proper amount of glue into the cavity, (b) drive a dowel into the cavity following the injection of the glue into the cavity, (c) feed a dowel to the feed end of the flexible tube, and (d) accept a dowel into the chamber of the dowel gun for the next cycle of operation.

BRIEF DESCRIPTION OF THE INVENTION

The above objectives are achieved in accordance with the present invention by providing novel dowel gun and feed apparatus for feeding dowels to the gun through a flexible tube from a bulk supply of the dowels. The bulk supply of dowels can be a bowl having a vibratory feeder associated therewith as is well known in the art. The vibratory feeder has a raceway or track along which the dowels move in end-to-end relationship to a feed station.

The apparatus of the present invention comprises a novel handling mechanism at the feed station for accepting dowels from the vibratory feeder and forcing the dowels, one at a time, into the receiving end of a flexible tube which is connected at its other end to a dowel shooting gun. A similar, novel handling mechanism is provided at the terminal end of the flexible tube for accepting dowels from the tube and feeding the dowels, one at a time, into the chamber of the dowel shooting gun. The dowel is then ejected from the chamber into a preformed cavity in a workpiece at the command of the operator.

Each of the handling mechanisms comprises a sliding block which moves in a slideway. A bore is provided in the block at the feed end of the flexible tube, and the chamber of the shooting gun is provided in the block at the terminal end of the flexible tube. The blocks move alternately back and forth between first respective positions in which they receive a dowel and second respective positions in which the dowel is driven forward by a mechanical striker or pusher. The positive action of the blocks in advancing one dowel at a time results in a system which avoids jamming and misalignment occurring in the dowel feed system which has plagued the automatic dowel gun systems of the prior art.

A novel system is further provided for injecting a proper amount of liquid glue into the cavity of the workpiece immediately prior to the ejection of the dowel into the cavity. The system includes a supply of liquid glue under pressure and a conduit for directing the glue to a nose cone which has an orifice for injecting the glue into the cavity. A synchronizing timer-controller is provided for controlling the operation of all components combined apparatus. Upon pressing of the trigger on the dowel gun, the timer-controller operates a control valve in the liquid glue conduit to inject a proper amount of glue into the cavity, and immediately following that, the timer-controller means activates a striker to drive a dowel from the chamber into the cavity of the workpiece. The handling mechanisms at the feed station and the dowel gun are then activated to feed a dowel to the feed end of the flexible tube, and to push a dowel from the flexible tube into the chamber of the dowel gun for the next cycle of operation.

Additional objects and features of the invention will become apparent from the following detailed description, taken together with the accompanying drawings.

THE DRAWINGS

A preferred embodiment of the apparatus of the present invention representing the best mode presently contemplated of carrying out the invention is illustrated in the accompanying drawings in which.

DETAILED DESCRIPTION OF THE ILLUSTRATED EMBODIMENT

Figure 1:
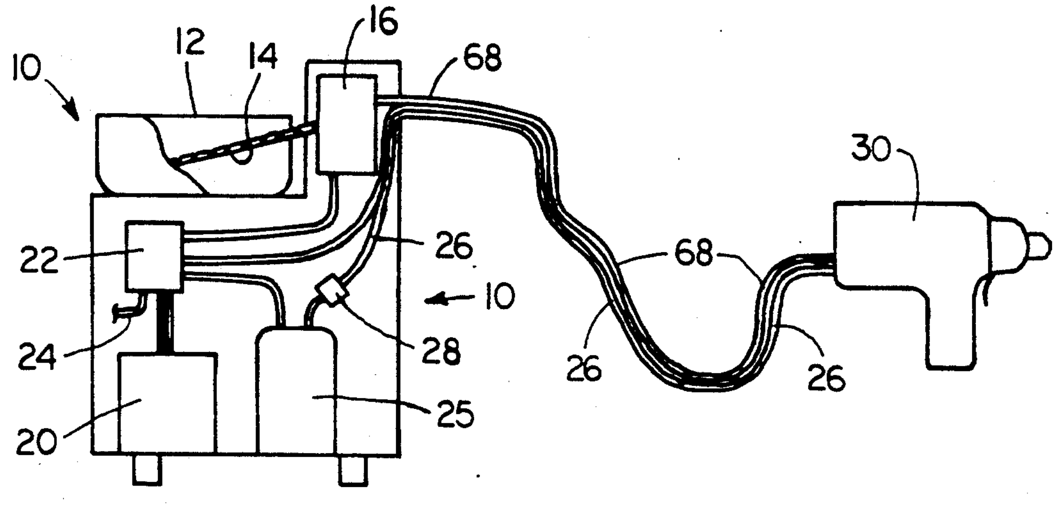
FIG. 1 is a schematic view of a preferred embodiment of a dowel shooting gun and dowel feed system in accordance with the present invention.

Referring to the drawings, a schematic representation of a dowel gun and dowel feed system in accordance with the present invention is shown in FIG. 1. A control unit 10 is provided having a conventional vibratory feed bin 12 positioned on the top thereof. The vibratory bowl feeder 12 is of conventional design which is well known in the art and needs no further description. Suffice it to say that the vibratory bowl feeder 12 advances a column of dowels in end-to-end relationship up a ramp 14 to the dowel singulator 16 of the present invention.

The control unit 10 further comprises a synchronizing timer-controller 20 which is coupled to a control manifold 22. The control manifold 22 contains a primary supply 24 of air under pressure and a system of valves (not shown in the drawings) which are controlled by the timer-controller 20 to operate pneumatic pistons which will be described hereinafter. In addition to the timer-controller 20 and the control manifold 22, the control unit 20 has a container 25 for liquid glue and means for pressurizing the glue container 20 with air under pressure from the control manifold 22. A glue conduit 26 communicates with the glue container for conveying liquid glue to the shooting gun 30 as will be more fully described hereinafter. The glue conduit 26 has a control valve 28 in line therewith, with the control valve 28 being controlled by the timer-controller 20.

Figure 3:
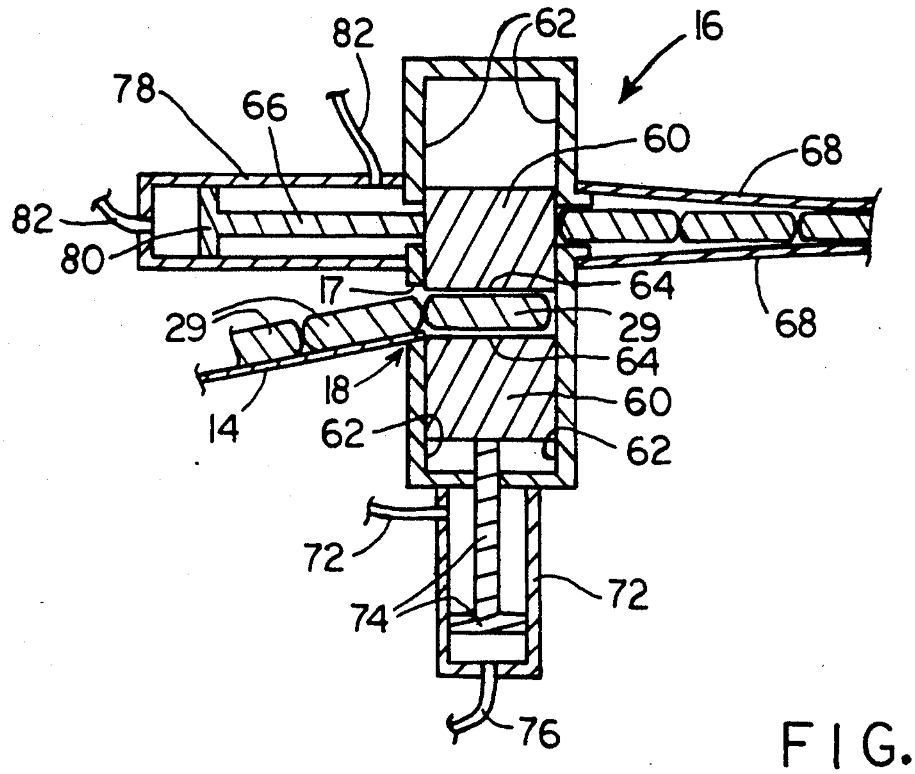

As best illustrated in FIG. 3, the dowel singulator 16 comprises a sliding block 60 received in a slideway 62 for reciprocating movement in the slideway 62. Dowels 29 are fed in end-to-end fashion to a feed station 18 near one end of the slideway 62. The feed station 18, as illustrated, comprises an opening 17 in the housing of the singulator 16, with the opening extending through the housing to the slideway 62. The ramp 14 from the vibratory bowl feeder extends to the opening 17 such that dowels move in line into the opening 17. A bore 64 extends between opposite sides of the block 60, with the bore 64 being oriented substantially transverse of the sliding movement of the block 60 in the slideway 62. When an empty bore 64 is in alignment with the feed station 18, the dowel at the feed station 18 is advanced into the empty bore 64.

Means are provided for moving the block 60 alternately back and forth between a loading position at one end of the slideway 62 and an ejection position at the opposite end of the slideway 62. When the block 60 is in the loading position, the bore 64 is aligned with the feed station 18 and receives a dowel from the feed station 18. The block 60 has a width which is essentially the same as the length of a dowel, and when the block 60 moves to its ejection position, the side of the block stops further advancement of the subsequent dowel past the feed station 18. Once the block 60 moves back so that an empty bore 64 is in alignment with the feed station 18, the next dowel then moves into the empty bore 64.

When the block 60 is in the ejection position, the dowel is pushed from the bore 64 of the block 60 by a push rod 66 which is positioned at one side of the slideway 62 near the opposite end of the slideway 62. The push rod 66 is positioned so as to be in alignment with the bore 64 in the block 60 when the block 60 is in the dowel ejection position.

An elongate, flexible tube 68 has its first end mounted at an opposite side of the slideway 62 from the push rod 66 so as to be in alignment with the push rod 66 and also in alignment with the bore 64 in the block 60 when the block 60 is in the dowel ejection position. Means are provided for moving the push rod 66 back and forth between a retracted position adjacent to the bore 64 and an extended position in which the push rod 66 extends through the bore 64 in the block 60 when the block 60 is in the dowel ejection position. When the push rod 66 moves to its extended position, the dowel in the bore 64 is pushed into the flexible tube 68. By subsequent operations, the flexible tube 68 can be filled from the first end at the singulator 16 to the second end at the dowel gun 30, with the dowels being aligned in end-to-end, abutting relationship within the flexible tube 68.

The means for moving the block 60 preferably comprises a pneumatic actuator 72 having a piston and rod 74 which are interconnected with the block 60. The pneumatic actuator 72 is connected by appropriate pneumatic lines 76 to the control manifold 22 of FIG. 1, such that the timer-controller 20 can control operation of the pneumatic actuator 72.

The means for moving the push rod 66 preferably comprises another pneumatic actuator 78. The push rod 66 is connected to the piston 80, and as the piston 80 is extended, the push rod 66 extends through the bore 64 in the block 60 as explained above. The pneumatic actuator 78 is connected by appropriate pneumatic lines 82 to the control manifold 22 of FIG. 1, such that the timer-controller 20 can control operation of the pneumatic actuator 78.

The second end of the flexible tube 68 is coupled to a dowel shooting gun 30, with the gun 30 best being illustrated The gun 30 has a chamber 32 for holding a dowel 29, and means are provided for interconnecting the second end of the flexible tube 68 with the chamber 32, such that when the push rod 66 pushes a dowel into the tube 68, which is otherwise filled with dowels, a dowel is advanced into the chamber 32.

The chamber 32 is then adapted to move to a position in which it is in alignment with a striker 34. Means are provided for moving the striker 34 back and forth between a retracted position and an ejection position, with the dowel being pushed from the chamber 32 through a nose cone 36 into a preformed cavity 38 in the workpiece 40 when the striker 34 moves to the ejection position.

The means for interconnecting the second end of the flexible tube 68 with the chamber 32 comprises a sliding block 44 received in a slideway 46 for reciprocating movement in the slideway 46. The chamber 32 is formed from an opening which extends between opposite sides of the block 44, with the chamber or opening being oriented substantially transverse of the sliding movement of the block 44 in the slideway 46. The second end of the flexible tube 68 comprises an extension portion 54 which leads straight through the housing of the gun 30 to open into the slideway 46.

Means are provided for sliding the block 44 alternately back and forth between a loading position and an ejection position. When the block 44 is in the loading position, the second end of the flexible tube 68, with its extension portion 54, is in alignment with the chamber 32 such that a dowel can be received in the chamber 32 from the extension portion 54 of the flexible tube 68. When the block 44 is in the ejection position, the chamber 32 is aligned with the striker 34 for ejection of a dowel from the chamber 32 by the striker 34 to drive the dowel into the preformed cavity 38 in the workpiece 40.

The means for moving the block 44 preferably comprises a pneumatic actuator 48 having a piston and rod 50 which are interconnected with the block 44. The pneumatic actuator 48 is connected by appropriate pneumatic lines 52 to the control manifold 22 of FIG. 1, such that the timer-controller 20 can control operation of the pneumatic actuator 48. The block 44 has a width which is essentially the same as the length of a dowel, and when the block 44 moves to its ejection position, the side of the block 44 stops further advancement of the subsequent dowels in the flexible tube 68 and its extension portion 54. Once the block 44 moves back into alignment with the flexible tube 68 and its extension portion 54, the next dowel moves into the empty chamber 32 of the block 44.

The means for moving the striker 34 preferably comprises another pneumatic actuator 56. The striker 34 is in the form of an elongate rod attached to a piston 57, and as the piston 57 is extended, the striker 34 extends through the chamber 32 to drive the dowel into the cavity 38 in the workpiece 40. Following the driving of the dowel into the cavity 38, the striker 34 retracts back to the retracted position ready to drive a subsequent dowel from the chamber 32. The pneumatic actuator 56 is connected by appropriate pneumatic lines 58 to the control manifold 22 of FIG. 1, such that the timer-controller 20 can control operation of the pneumatic actuator 56.

Figure 2:
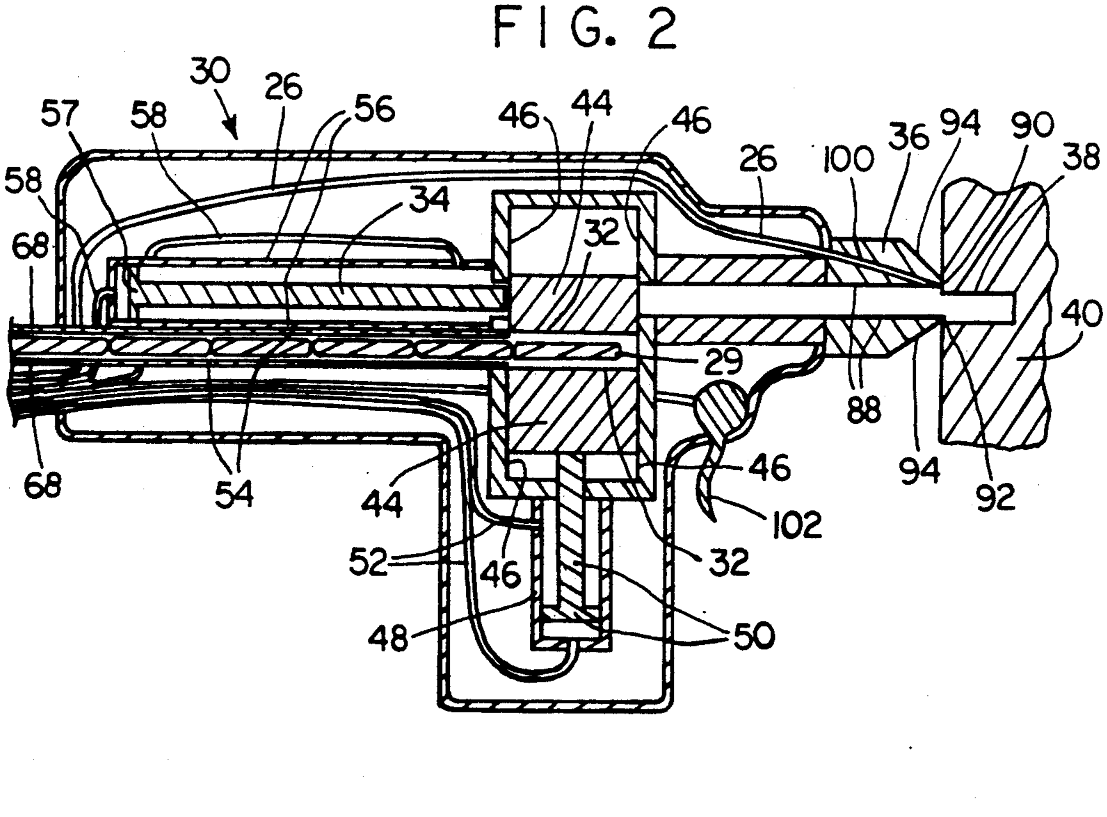
FIG. 2 is a schematic cross section of a dowel singulator and feeder in accordance with the present invention which accepts dowels one at a time from the dowel feed station and injects the dowels one at a time into the flexible tube leading to the dowel shooting gun.
Figure 5:
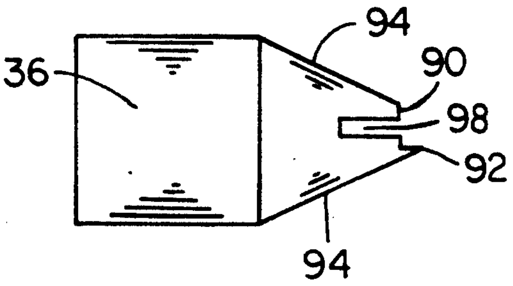
FIG. 5 is a side view of the nose cone of FIG. 4.
Figure 4:
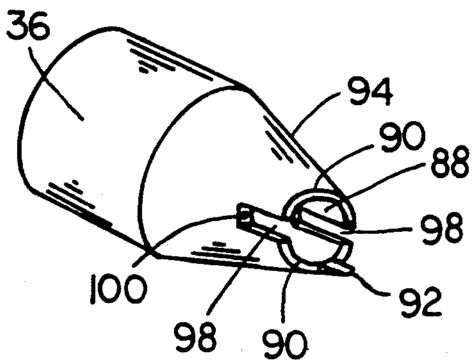
FIG. 4 is a pictorial view of a preferred nose cone for the dowel shooting gun of the present invention.
Figure 6:
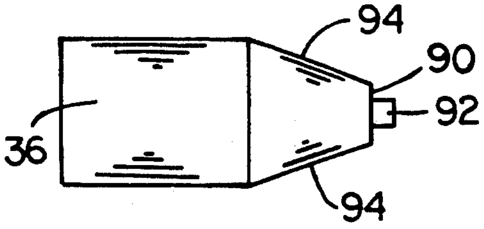
FIG. 6 is a top view of the nose cone of FIG. 4.

A novel nose cone 36 is also provided for a dowel shooting gun. The nose cone 36 is best illustrated in FIGS. 4–6. It comprises a bore 88 with a cylindrical sidewall, with the bore 88 being in alignment with the chamber 32 of the dowel gun 30 when the chamber is in its ejection position. The nose cone 36 has an outer end portion which tapers inwardly in the shape of a truncated cone 94, with the free end of the truncated cone 94 forming an abutment ring 90 circumscribing the bore 88 at the outer end of the nose cone 36. The abutment ring 90 is adapted for placement against the workpiece 40 in alignment with the preformed cavity 38 as shown in FIG. 2.

A curvilinear lug 92 projects from the abutment ring 90, with the lug 92 having a curved inner surface in alignment with the sidewall of the bore 88. The outer surface of lug 92 forms a continuous, tapered, curvilinear extension of the truncated cone 94. The lug 92 acts as a guide to correctly position the abutment ring 90 in substantially axial alignment with the cavity 38 in the workpiece 40 as shown in FIG. 2. The lug 92 is positioned in the cavity 38 against an edge of the cavity 38. The continuous, smooth, tapered surface of the truncated cone 94 and the lug 92 is important in facilitating removal of the lug 92 from the cavity 32 as the dowel is being forced into the cavity 32. The tapered, smooth surface of the lug 92 slides smoothly out of the cavity 32 simultaneously as the dowel is being pushed into the cavity 32.

The lug 92 is relatively small in comparison to the circumference of the abutment ring 90. Preferably, the lug 92 has a dimension along the circumference of the abutment ring 90 which is no more than about one-fourth the total circumference of the abutment ring 90.

A notch 98 is preferably cut inwardly from the abutment ring 90 as shown in FIGS. 4 and 5.; An internal passage 100 (FIGS. 2 and 4) extends from the notch 98 to an opposite end of the nose cone 36 adjacent to the chamber 32, and means are provided for injecting liquid glue through the passage 100 to be ejected into the cavity 38 in the workpiece 40 immediately prior to pushing the dowel into the cavity.

As illustrated, the glue conduit 26 extends along the flexible tube 68 from the control unit 10 to the gun 30. The glue conduit 26 then passes through the housing of the gun 30 to join the passage 100 in the nose cone 36. The control valve 28 (FIG. 1) controls flow of liquid glue through the glue conduit 26 so that immediately prior to driving a dowel from the gun 30, a proper amount of glue is injected or sprayed from the passage 100 in the nose cone 36 into the cavity in which the dowel is to be driven. The nose cone 36 can be provided with two passages 100 as shown in FIG. 4, with each passage having an opening at a respective notch 98 in the nose cone 36. The glue conduit 26 communicates with both passages 100 when two such passages 100 are employed.

The dowel shooting gun 30 further comprises a trigger 102 which is linked to the synchronizing timer-controller 20. The timer-controller 20 is adapted to synchronize the operation of the pneumatic actuators for the striker 34, the block 44, the push rod 66 and the sliding block 60, such that the sequence of operations is performed as follows. Upon activation of the trigger 102, the pneumatic actuator 56 first moves the striker 34 to its ejection position to push a dowel out of the chamber 32 and then moves the striker 34 back to its retracted position. The pneumatic actuator 48 is then actuated to move the block 44 first to its loading position to receive a subsequent dowel from the flexible tube 68 and then back to its ejection position. While the block 44 is returning to its ejection position, the pneumatic actuator 78 is actuated to move the push rod 66 to its retracted position. The pneumatic actuator 72 is then actuated to first move the sliding block 60 to its loading position to receive a subsequent dowel from the feed station 18 and then back to its ejection position. Then, upon return of the sliding block 60 to its ejection position, the pneumatic actuator 78 is actuated to move the push rod 66 to its extended position to push the dowel from the bore 64 in the sliding block 66 into the flexible tube 68 and advance the dowels in the flexible tube 68 toward the dowel gun 30. The synchronizing timer-controller 20 is further advantageously adapted to turn the valve 28 momentarily on and then back off upon activation of the trigger 102 and just before the movement of the striker 34 to inject liquid glue into the cavity in the workpiece.

Although preferred embodiments of the apparatus of the present invention have been illustrated and described, it is to be understood that the present disclosure is made by way of example and that various other embodiments are possible without departing from the subject matter coming within the scope of the following claims, which subject matter is regarded as the invention.

I claim:

1. Apparatus for inserting dowels into preformed cavities in a workpiece, said apparatus comprising a sliding block received in a slideway for reciprocating movement in said slideway;

means for feeding dowels in end-to-end fashion to a feed station near one end of said slideway;

a bore which extends between opposite sides of said block, with said bore being oriented substantially transverse of the sliding movement of said block in said slideway;

means for moving said block alternately back and forth between a loading position near one end of said slideway wherein said bore receives a dowel from said feed station and an ejection position near the opposite end of the slideway;

a push rod positioned at one side of said slideway near the opposite end of the slideway, said push rod being in alignment with said bore in said block when the block is in the dowel ejection position;

an elongate, flexible tube having first and second ends, with the first end mounted at an opposite side of said slideway from said push rod so as to be in alignment with said push rod and also in alignment with said bore in said block when the block is in the dowel ejection position;

means for moving said push rod back and forth between a retracted position adjacent to said bore and an extended position in which the push rod extends through said bore in said block when the block is in the dowel ejection position such that the dowel in the bore is pushed into said flexible tube;

a dowel shooting gun having a chamber for holding a dowel and a barrel through which the dowel passes as it is being inserted into a cavity;

means for interconnecting said second end of said flexible tube with said chamber;

a second sliding block received in a second slideway for reciprocating movement in said second slideway;

said chamber is formed from an opening which extends between opposite sides of said block, with said opening being oriented substantially transverse of the sliding movement of said second block in said second slideway;

means for sliding said second block alternately back and forth between a loading position in which said second end of said flexible tube is in alignment with said chamber such that a dowel can be received in said chamber from said flexible tube and an ejection position in which said chamber is aligned with said barrel;

a striker for engaging a dowel in said chamber when said chamber is in alignment with said barrel; and means for moving the striker back and forth between a retracted position and an ejection position, with the dowel being pushed from the chamber through said barrel into said preformed cavity in the workpiece when the striker moves to the ejection position.

2. Apparatus in accordance with claim 1, wherein said dowel shooting gun further comprises a nose cone having a bore with a cylindrical sidewall, said bore being in alignment with said barrel;

said nose cone having an outer end portion which tapers inwardly in the shape of a truncated cone, with a tree end of the truncated cone forming an abutment ring circumscribing the bore at the outer end of the nose cone, said abutment ring being adapted for placement against the workpiece in alignment with the preformed cavity in said workpiece.

3. Apparatus in accordance with claim 2, wherein a notch is cut inwardly from the abutment ring;

a passage extends from the notch to an opposite end of said nose cone adjacent to said barrel; and means are provided for injecting liquid glue through the passage to be ejected into the cavity in the workpiece immediately prior to pushing the dowel into the cavity.

4. Apparatus in accordance with claim 1, wherein said dowel shooting gun further comprises a nose cone having a bore with a cylindrical sidewall, said bore being in alignment with the chamber;

said nose cone having an outer end portion which tapers inwardly in the shape of a truncated cone, with a free end of the truncated cone forming an abutment ring circumscribing the bore at the outer end of the nose cone, said abutment ring being adapted for placement against the workpiece in alignment with the preformed cavity in said workpiece.

5. Apparatus in accordance with claim 4, wherein a notch is cut inwardly from the abutment ring;

a passage extends from the notch to an opposite end of said nose cone adjacent to said barrel; and means are provided for injecting liquid glue through the passage to be ejected into the cavity in the workpiece immediately prior to pushing the dowel into the cavity.

6. Apparatus in accordance with claim 1, wherein the means for sliding said block and said second block comprises first and second pneumatic actuators which move said block and said second block, respectively, back and forth between their loading and ejection positions, the means for moving said push rod through said bore in said block comprises a third pneumatic actuator which moves said push rod back and forth between its retracted and extended positions, and the means for moving said striker comprises a fourth pneumatic actuator which moves the striker back and forth between its retracted and ejection positions.

7. Apparatus in accordance with claim 6 wherein said dowel shooting gun further comprises a trigger which is linked to a synchronizing timer means that synchronizes the operation of the pneumatic actuators for the striker, the block, the push rod and the second block, such that the sequence of operations comprises (a) upon activation of the trigger, said fourth pneumatic actuator first moves the striker to its ejection position to push a dowel out of said chamber and then moves the striker back to its retracted position, (b) said second pneumatic actuator is then actuated to move said second block first to its loading position to receive a subsequent dowel from said flexible tube and then back to its ejection position, (c) while said second block is returning to its ejection position, said third pneumatic actuator is actuated to move the push rod to its initial retracted, (d) said first pneumatic actuator is then actuated to first move said block to its loading position to receive a subsequent dowel from said feed station and then back to its ejection position, and (e) upon return of said block to its ejection position, said third pneumatic actuator is actuated to move the push rod to its extended position to push the dowel from said bore in said block into said flexible tube.

8. Apparatus in accordance with claim 7, wherein there is further provided a nose cone on said dowel gun, said nose cone having a bore which is in alignment with said barrel an orifice in said nose cone for spraying glue into said cavity in said workpiece;

a supply of glue under pressure;

a conduit for transfer of glue from said supply to said orifice in said nose cone;

a valve in said conduit for controlling flow of glue in said conduit; and said synchronizing timer means turns said valve momentarily on and then back off upon activation of the trigger and just before the movement of the striker.

9. A method of handling dowels and driving the dowels from a barrel in a dowel shooting gun into preformed cavities in a workpiece, said method comprising (a) feeding dowels from a bulk supply of dowels to a feed station;

(b) transferring a dowel from the feed station into one end of an elongate, flexible tube by moving a block having a bore extending therethrough to a first position in which the bore is in alignment with the feed station for accepting a dowel into said bore, then moving said block to a second position in which the bore is in alignment with one end of said tube, and then ejecting the dowel from said bore into said tube;

(c) positioning a movable chamber in the dowel shooting gun at a dowel receiving position in which the chamber is in alignment with the other end of said tube and out of alignment with the barrel of said gun;

(d) transferring a dowel through said tube and into said chamber of a dowel shooting gun when said chamber is in its dowel receiving position by ejecting a dowel from the other end of said tube into said chamber which is formed by an opening extruding through a second block;

(e) moving said chamber to a second position in which it is in alignment with said barrel of said gun by moving said second block into a position in which said chamber therein is brought into alignment with said barrel and a striker;

(f) aligning the barrel of said gun with a preformed cavity in the workpiece;

(g) injecting liquid glue into said cavity;

(h) applying a force to the dowel in said chamber to drive the dowel from said chamber through said barrel of said gun into the cavity in the workpiece by moving the striker to eject the dowel from said chamber and force the dowel into the preformed cavity in the workpiece; and (i) repeating steps (a) through (h).

* * * * *